US011608039B2

(12) United States Patent
Goyez

(10) Patent No.: US 11,608,039 B2
(45) Date of Patent: Mar. 21, 2023

(54) PIECE OF ELECTRICAL EQUIPMENT FOR CONNECTING TO AN ELECTROMECHANICAL BRAKE ACTUATOR AND TO AN ELECTROMECHANICAL DRIVE ACTUATOR

(71) Applicant: SAFRAN LANDING SYSTEMS, Velizy Villacoublay (FR)

(72) Inventor: Brian Goyez, Viroflay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 1179 days.

(21) Appl. No.: 16/173,746

(22) Filed: Oct. 29, 2018

(65) Prior Publication Data

US 2019/0126894 A1    May 2, 2019

(30) Foreign Application Priority Data

Oct. 30, 2017  (FR) ..................................... 17 60206

(51) Int. Cl.
*B60T 8/17* (2006.01)
*B60T 8/32* (2006.01)
(Continued)

(52) U.S. Cl.
CPC ............ *B60T 8/1703* (2013.01); *B60T 8/325* (2013.01); *B60T 13/741* (2013.01);
(Continued)

(58) Field of Classification Search
CPC ..... B60T 8/1703; B60T 13/741; B64C 25/44; B64C 25/405; B64C 25/50; B64C 25/36
See application file for complete search history.

(56) References Cited

U.S. PATENT DOCUMENTS

2006/0065779 A1    3/2006  McCoskey et al.
2007/0239372 A1*  10/2007  Schweitzer ............... H02J 3/14
                                                              702/57
(Continued)

FOREIGN PATENT DOCUMENTS

EP    2 327 595 A1    6/2011
EP    2 666 717 A2   11/2013
(Continued)

OTHER PUBLICATIONS

French Preliminary Search Report for 17 60206 dated Jun. 20, 2018.

*Primary Examiner* — Vishal R Sahni
(74) *Attorney, Agent, or Firm* — Sughrue Mion, PLLC

(57) ABSTRACT

A piece of electrical equipment for connecting both to at least one electromechanical braking actuator and also to at least one electromechanical drive actuator, the piece of electrical equipment (13a) comprising a housing (30), means for fastening the housing to the undercarriage, and inside the housing:
a processor unit (32) arranged to generate a braking motor control signal and a drive motor control signal;
a power supply unit (37) arranged to generate an equipment power supply voltage, a braking power supply voltage, and a drive power supply voltage;
a power converter unit (40) arranged to generate a braking control voltage and a drive control voltage; and
a distribution unit arranged to distribute the braking control voltage to the electromechanical braking actuator and the drive control voltage to the electromechanical drive actuator.

19 Claims, 2 Drawing Sheets

(51) Int. Cl.
  *H02J 1/00*    (2006.01)
  *B60T 13/74*   (2006.01)
  *B64C 25/40*   (2006.01)
  *B64C 25/44*   (2006.01)
  *H02P 3/00*    (2006.01)
  *H02P 3/04*    (2006.01)

(52) U.S. Cl.
  CPC ............ *B64C 25/405* (2013.01); *B64C 25/44* (2013.01); *H02J 1/00* (2013.01); *B60T 8/3255* (2013.01); *H02P 3/00* (2013.01); *H02P 3/04* (2013.01)

(56) References Cited

U.S. PATENT DOCUMENTS

2008/0258014 A1   10/2008   McCoskey et al.
2009/0240412 A1*   9/2009   Cahill .................... B60T 17/22
                                                       303/20
2010/0252691 A1*  10/2010   Malkin ................... H02J 3/14
                                                       244/76 R
2011/0132704 A1*   6/2011   Hanlon ............... F16D 65/0043
                                                       244/110 H
2011/0266867 A1*  11/2011   Schindler ................ G06F 1/266
                                                       307/24
2013/0292992 A1*  11/2013   Cahill .................... B64C 25/44
                                                       301/6.2
2016/0016658 A1*   1/2016   Walitzki ................ B64C 25/405
                                                       244/50
2017/0021920 A1*   1/2017   Drennen ................ B64C 25/44

FOREIGN PATENT DOCUMENTS

EP      3 121 077 A1    1/2017
WO     2007/027588 A1   3/2007

\* cited by examiner

PIECE OF ELECTRICAL EQUIPMENT FOR CONNECTING TO AN ELECTROMECHANICAL BRAKE ACTUATOR AND TO AN ELECTROMECHANICAL DRIVE ACTUATOR

The invention relates to the field of electrical equipment for connecting to an electromechanical brake actuator and to an electromechanical drive actuator.

BACKGROUND OF THE INVENTION

In modern aircraft, numerous functions that used to be performed by using systems that were purely mechanical or hydraulic, are now being performed by so-called "electrical" systems.

When the purpose of such functions is to drive a moving part, electrical systems include an electromechanical actuator or an electrohydrostatic actuator. Thus, certain modern aircraft are fitted with an electrical flight control system or with an electrical braking system.

In this context, proposals have been made to equip certain modern aircraft with an electrical system for taxiing. The electrical taxiing system serves to move an aircraft on the ground without making use of the jets of the aircraft and without using an aircraft tractor. An electrical taxiing system drives some of the wheels of the aircraft in rotation, and for that purpose it includes a drive device comprising an electromechanical drive actuator.

Each electromechanical or electrohydrostatic actuator of such electrical systems needs to be connected via at least one power bus to a power supply unit that powers the electric motor of the electromechanical or electrohydrostatic actuator, optionally via at least one communication bus to a processor unit that controls the electric motor, and possibly via at least one communication bus to a data concentrator that receives measurements taken by a sensor of the electromechanical or electrohydrostatic actuator. It can thus be understood that a large number of power units, processor units, and data concentrators are integrated in modern aircraft, and that a large number of power buses and of communication buses are used in modern aircraft.

The increase in such electrical equipment and such buses tends to increase the weight and the cost of aircraft and to reduce the reliability of the electrical systems in which they are used.

OBJECT OF THE INVENTION

An object of the invention is to reduce the weight and the cost of an aircraft, and to increase its reliability.

SUMMARY OF THE INVENTION

In order to achieve this object, the invention provides a piece of electrical equipment for connecting both to at least one electromechanical braking actuator arranged to brake a wheel of an aircraft undercarriage and also to at least one electromechanical drive actuator arranged to drive the wheel in rotation, the piece of electrical equipment comprising a housing, means for fastening the housing to the undercarriage, and inside the housing:

- a processor unit arranged to generate a braking motor control signal from a braking setpoint and a drive motor control signal from a taxiing setpoint;
- a power supply unit arranged to generate an equipment power supply voltage for powering the piece of electrical equipment, a braking power supply voltage, and a drive power supply voltage;
- a power converter unit arranged to generate a braking control voltage from the braking control signal and the braking power supply voltage, and a drive control voltage from the drive motor control signal and the drive power supply voltage; and
- a distribution unit arranged to distribute the braking control voltage to the electromechanical braking actuator and the drive control voltage to the electromechanical drive actuator.

For one or more wheels of the undercarriage of the aircraft, the piece of electrical equipment thus manages both the control of braking and also the control of taxiing. This reduces the number of pieces of electrical equipment the aircraft needs for braking and for taxiing.

In order to control the piece of electrical equipment, a single power bus and a single communication bus are needed. This single power bus and this single communication bus, which run along the undercarriage and which are therefore relatively long, replace a multitude of power buses and of communication buses of the same length. This thus serves to reduce considerably the number of power buses and of communication buses, and also the total length of said buses.

It can be seen that the piece of electrical equipment of the invention serves both to reduce considerably the weight and the cost of the aircraft, and also to increase the reliability of the aircraft's electrical braking and taxiing systems.

The invention also provides a system comprising two pieces of electrical equipment as described above, and both a communication bus and also a power bus connecting together the two pieces of electrical equipment, an electromechanical braking actuator, and an electromechanical drive actuator.

The invention also provides an undercarriage including a system as described above.

Other characteristics and advantages of the invention appear on reading the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
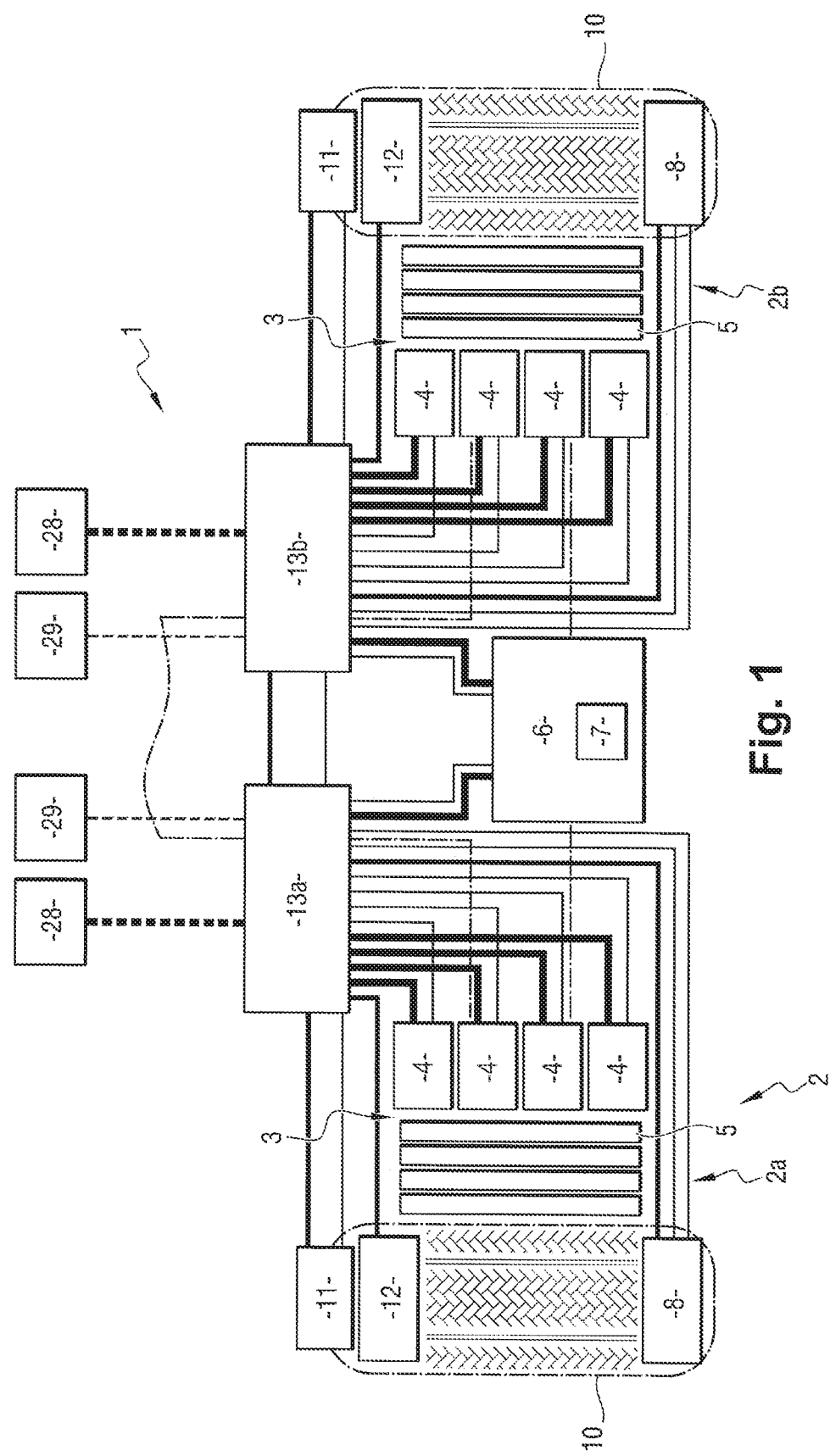
FIG. 1 shows a system comprising two pieces of electrical equipment of the invention positioned on an undercarriage, and two wheels of the undercarriage, each being provided both with a brake and also a device for driving the wheels.

With reference to FIG. 1, the invention is described in application to an aircraft undercarriage 1 having two wheels 2a and 2b.

Each wheel 2 has a brake 3 for braking the wheel 2. The brake 3 includes both friction members, specifically a stack of carbon disks 5, and also four electromechanical braking actuators 4 mounted on an actuator carrier.

The four electromechanical braking actuators 4 are used for applying a braking force to the stack of carbon disks 5, thereby exerting braking torque on the wheel 2 so as to slow down the wheel 2 and thus brake the aircraft when it is on the ground.

Each electromechanical braking actuator 4 comprises a pusher and a body fastened to the actuator carrier.

An electric motor and a mechanical module are integrated inside the body of the electromechanical braking actuator 4.

The mechanical module transforms a rotary movement of the output shaft of the electric motor into a linear movement of the pusher.

The pusher is actuated by the electric motor via the mechanical module so as to slide and apply the braking force against the stack of carbon disks 5.

Each electromechanical braking actuator 4 also has a blocking member serving to provide a parking brake. The blocking member is arranged to hold the output shaft of the electric motor in any given position, so as to block the pusher in position.

A drive device 6 for driving the wheels 2 is positioned at the bottom of the undercarriage 1. The drive device 6 includes an electromechanical drive actuator 7. The electromechanical drive actuator 7 comprises an electric motor and is arranged to drive the wheels 2 in rotation while the aircraft is on the ground.

Sensors 8 are integrated in each wheel 2. For each wheel 2, these sensors 8 comprise a pressure sensor for sensing the pressure inside a tire 10 of the wheel 2, a temperature sensor for sensing the temperature inside the stack of carbon disks 5, and a rotary speed sensor for sensing the speed of rotation of the wheel 2. Naturally, other sensors could be provided, e.g. a sensor for sensing wear of the brake of the wheel 2.

A data concentrator 11 is associated with each wheel 2. The data concentrators 11 are positioned on the undercarriage 1. The data concentrators 11 receive measurements taken by the sensors 8, they process and store these measurements, and they perform monitoring functions based on the measurements.

A brake fan 12 is integrated in each wheel 2. The brake fan 12 serves to cool the stack of carbon disks 5 between a landing and a takeoff following the landing. It should be observed that mounting brake fans 12 on an aircraft is optional.

Two pieces of electrical equipment 13a, 13b of the invention are positioned on the undercarriage 1. A "left" piece of electrical equipment 13a is associated with the wheel 2a situated on the left of the undercarriage 1 (relative to a longitudinal axis of a leg of the undercarriage 1), and a "right" piece of electrical equipment 13b is associated with the wheel 2b situated on the right of the undercarriage 1.

Nevertheless, it should be observed that the drive device 6 (and thus the electromechanical drive actuator 7) is controlled by the piece of electrical equipment 13a. In the event of said piece of electrical equipment 13a failing, the other piece of electrical equipment 13b takes over this control.

Figure 2:
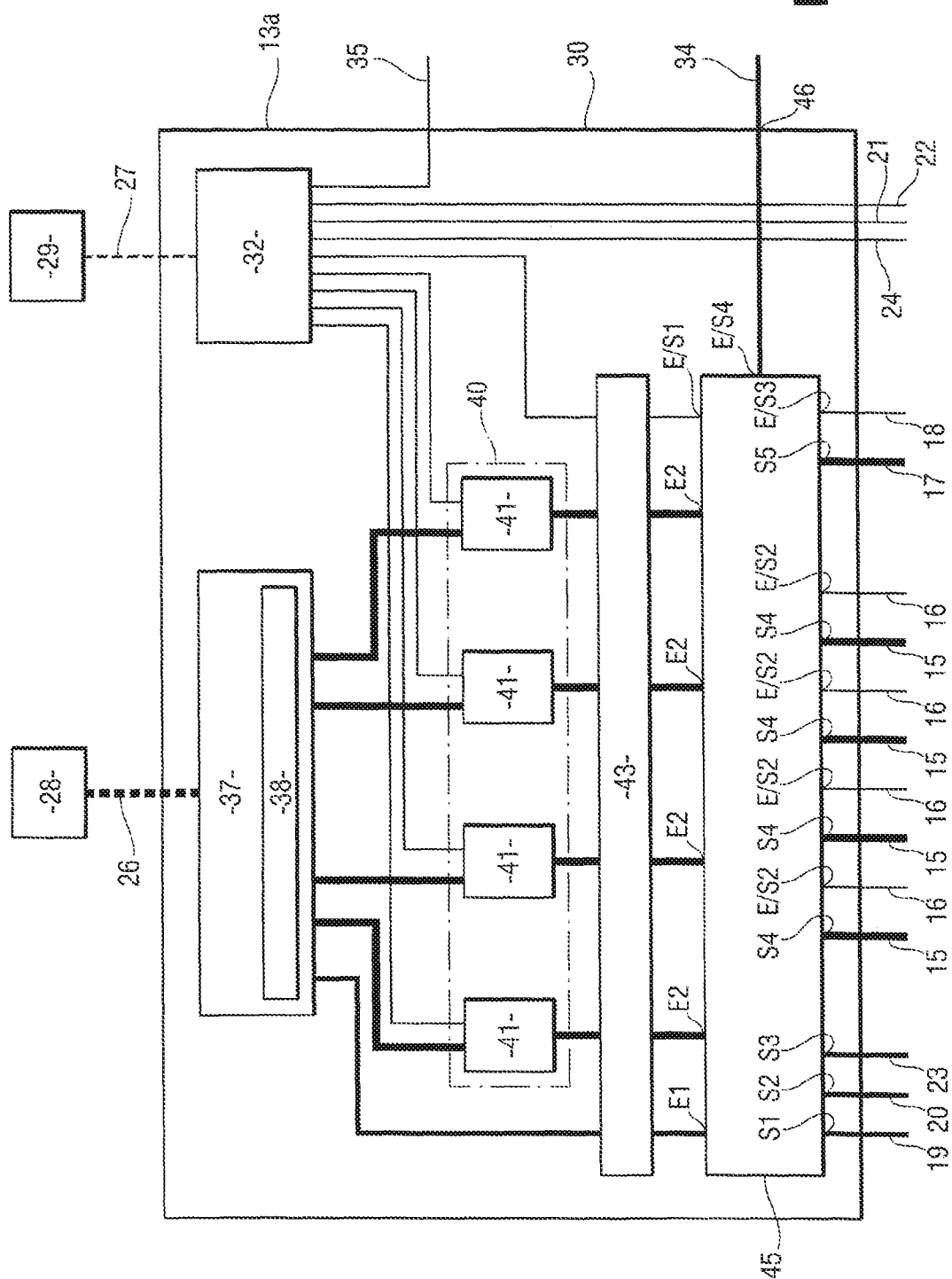
FIG. 2 shows a piece of electrical equipment of the invention.

With reference to FIG. 2, there follows a description of the piece of electrical equipment 13a that is associated with the wheel 2a. Naturally, the description below is equally valid for the other piece of electrical equipment 13b associated with the other wheel 2b.

The piece of electrical equipment 13a is connected: to each of the four electromechanical braking actuators 4 of the brake 3 of the wheel 2a via a high-power cable 15 and via an analog communication cable 16; to the drive device 6 by a high-power cable 17 and by an analog communication cable 18; to the brake fan 12 via a low-power cable 19; to the sensors 8 via low-power cables 20, digital communication cables 21, and analog communication cables 22; to the data concentrator 11 via a low-power cable 23 and via a digital communication cable 24; and to the other piece of electrical equipment 13b via a low-power bus 34 and via a digital communication bus 35. Each digital communication cable comprises one or more wires that convey digital signals. Each analog communication cable comprises one or more wires that convey analog signals.

The piece of electrical equipment 13a is also connected to the remainder of the aircraft via a high-power bus 26 and via a digital communication bus 27.

The high-power bus 26 transports electrical power coming from an electrical master box 28 of the aircraft.

The digital communication bus 27 connects the piece of electrical equipment 13a to a computer 29. The computer 29, which is integrated in the avionics network of the aircraft, is positioned in a bay located inside the fuselage of the aircraft. The computer 29 forms part of the ATA42 set of integrated modular avionics systems. For example, the digital communication bus 27 is a digital bus of the AFDX type or of the µAFDX type.

The piece of electrical equipment 13a includes a housing 30 and means for fastening the housing 30 to the undercarriage 1. Specifically, the housing 30 is fastened to the leg of the undercarriage 1. The housing 30 is in the form of a cabinet. The cabinet has a door arranged to allow an operator on the ground to access the inside of the housing 30.

The term "door" is used herein to mean any access means that can be moved between an open position in which the inside of the housing 30 is accessible, and a closed position in which the access means close the housing 30. The access means may optionally be removable.

The piece of electrical equipment 13a includes a processor unit 32. The processor unit 32 includes one or more processor components having programmed therein a braking control module, a braking motor control module, a taxiing control module, and a drive motor control module.

In this example, the processor component(s) comprise a microcontroller and/or a field programmable gate array (FPGA) and/or an application specific integrated circuit (ASIC) and/or a processor.

The processor unit 32 receives a braking setpoint from the computer 29 via the digital communication bus 27. The braking control module receives the braking setpoint and applies high level braking control relationship with slow loops in order to produce a braking control signal. The braking motor control module acquires the braking control signal and performs fast servo-control loops for controlling the motor, in order to produce control signals for the braking motor.

The processor unit 32 also receives control signals for the members for blocking the electromechanical braking actuators 4 of the wheel 2a.

The processor unit 32 also receives a taxiing setpoint from the computer 29 via the digital communication bus 27.

The taxiing control module receives the taxiing setpoint and applies a high-level taxiing control relationship with slow loops to produce a taxiing control signal. The drive motor control module acquires the taxiing control signal and performs fast servo-control loops for controlling the motor in order to produce a drive motor control signal.

The processor unit 32 also receives a control signal to activate the brake fan 12.

The processor unit 32 receives digital data produced by the sensors 8 via the digital communication cables 21, it receives analog data produced by the sensors 8 via the analog communication cables 22, and it exchanges digital data with the data concentrator 11 via the digital communication cable 24.

The processor unit 32 of the piece of electrical equipment 13a also exchanges digital data with the processor unit 32 of the other piece of electrical equipment 13b via the digital communication bus 35.

The piece of electrical equipment 13a also includes a power supply unit 37. The power supply unit 37 receives a general power supply from the electrical master box 28 via the high-power bus 26, i.e. it receives general power supply electric current at a general power supply voltage.

From the general power supply voltage, the power supply unit 37 produces a low power supply voltage and a high power supply voltage.

The low power supply voltage constitutes simultaneously: an equipment power supply voltage used to power the electrical components of the piece of electrical equipment 13a; a fan power supply voltage used to power the brake fan 12; a sensor power supply voltage used to power the sensors 8; a data concentrator power supply voltage used to power the data concentrator 11; and an output power supply voltage.

The high power supply voltage constitutes both a braking power supply voltage for powering the electromechanical braking actuators 4 and a drive power supply voltage for powering the electromechanical drive actuator 7.

In this example, the high power supply voltage is a direct current (DC) voltage of 540 volts (V) Vdc, however it could be some other voltage, e.g. 200 Vdc, 270 Vdc, 300 Vdc, etc. In this example, the low power supply voltage is 28 Vdc, but it could be some other voltage, e.g. 10 Vdc, 50 Vdc, etc.

The power supply unit 37 also has protection means 38. The protection means 38 prevent return power from returning to an electrical system of the aircraft that is situated upstream from the piece of electrical equipment 13a. The term "upstream" is used to mean closer to the fuselage of the aircraft, as contrasted with closer to the wheel 2a. In this example, the electrical system in question comprises the electrical master box 28 that is connected to the piece of electrical equipment 13a via the high-power bus 26.

By way of example, return power could be generated by inverters of the power converter unit 40 (as described below). The protection means 38 serve to absorb such return power.

The power supply unit 37 also has monitor means that monitor the operation of the power supply unit 37.

The piece of electrical equipment 13a also includes a power converter unit 40. In this example, the power converter unit 40 includes four power converter members 41, i.e. one for each electromechanical braking actuator 4. Each power converter member 41 comprises an inverter and a digital communication module.

Each power converter member 41 is intended firstly to control an electromechanical braking actuator 4 of the brake 3 of the wheel 2a.

The digital communication module of the power converter member 41 thus receives the control signal for the braking motor (as generated by the processor unit 32) and the braking power supply voltage (i.e. the high power supply voltage generated by the power supply unit 37), and on the basis of the braking motor control signal and the braking power supply voltage it produces a braking control voltage for the electromechanical braking actuator 4.

The braking control voltage is a three-phase alternating voltage.

One of the power converter members 41 is also used to control the electromechanical drive actuator 7 of the drive device 6. The digital communication module of this power converter member 41 thus receives the braking motor control signal (as generated by the processor unit 32) and the drive power supply voltage (i.e. the high power supply voltage generated by the power supply unit 37), and on the basis of the drive motor control signal and of the drive power supply voltage it produces a drive control voltage for the electromechanical drive actuator 7.

The drive control voltage is a three-phase alternating voltage.

It should be observed that the braking control voltage and the drive control voltage are identical, such that one of the power converter members 41 can be used equally well for controlling an electromechanical braking actuator 4 and for controlling the electromechanical drive actuator 7. This is also made possible by the fact that the electromechanical braking actuators 4 and the electromechanical drive actuator 7 are not activated simultaneously.

Each power converter member 41 also has sensors for sensing electrical parameters (currents, voltages). The measurements taken by the electrical parameter sensors are returned by the digital communication module of the power converter unit 41 to the processor unit 32.

The piece of electrical equipment 13a also includes a filter block 43 situated at the outputs from the processor unit 32, from the power supply unit 37, and from the power converter unit 40. The filter block 43 serves to satisfy requirements concerning electromagnetic compatibility and the ability to withstand lightning as specified by the manufacturer of the aircraft.

The piece of electrical equipment 13a also includes a distribution unit. The distribution unit has array 45 of contactors with inputs, outputs, and input/outputs.

An output from the power supply unit 37 is connected via the filter block 43 to an input E1 of the contactor array 45. A low power supply voltage is applied to this input E1.

The output of each of the four power converter members 41 of the power converter unit 40 is connected to a respective input E2 of the contactor array 45. The braking control voltage, which is also the drive control voltage, is applied to each of these inputs E2.

An output from the processor unit 32 is connected to an input/output E/S1 of the contactor array 45. The processor unit 32 exchanges analog or digital data via this input/output E/S1.

An output S1 of the contactor array 45 is connected to the brake fan 12 via the low-power cable 19. An output S2 of the contactor array 45 is connected to the sensors 8 via the low-power cables 20. An output S3 of the contactor array 45 is connected to the data concentrator 11 via the low-power cable 23. For each of the four electromechanical braking actuators 4, an output S4 of the contactor array 45 is connected to said electromechanical braking actuator 4 via a high power cable 15, and an input/output E/S2 of the contactor array 45 is connected to said electromechanical braking actuator 4 via an analog communication cable 16.

An output S5 of the contactor array 45 is connected to drive device 6 via the high power cable 17, and an input/output E/S3 of the contactor array 45 is connected to the drive device 6 via the analog communication cable 18.

An input/output E/S4 of the contactor array 45 is connected to an input/output port 46 of the piece of electrical equipment 13a, which is connected via the low power bus 34 to the other piece of electrical equipment 13b.

The contactor array 45 can be configured by the processor unit 32.

When the processor unit 32 receives a braking setpoint, the contactor array 45 may be configured so that the piece of electrical equipment 13a controls braking of the wheel 2a. The contactor array 45 then distributes the braking control voltage produced by each of the power converter members 41 to respective ones of the electromechanical braking actuators 4. Analog data is exchanged between the processor unit 32 and the electromechanical braking actuators 4 via the analog communication cables 16, the inputs/outputs E/S2, and the input/output E/S1 of the contactor array 45.

When the processor unit 32 receives a taxiing setpoint, the contactor array 45 may be configured so that the piece of electrical equipment 13a controls driving of the wheel 2a. The contactor array 45 then distributes the drive control voltage produced by one of the power converter members 41 to the drive device 6, and thus to the electromechanical drive actuator 7.

Analog data is exchanged between the processor unit 32 and the drive device 6 via the analog communication cable 18, the input/output E/S3, and the input/output E/S1.

Naturally, the transmission of power and the exchange of data with the drive device 6 relates only to the electrical equipment that is in charge of controlling taxiing, i.e. in normal mode, the piece of electrical equipment 13a, or in the event of a failure of the piece of electrical equipment 13a, the piece of electrical equipment 13b. In the event of a failure of the piece of electrical equipment 13a, it is the other piece of electrical equipment 13b that controls taxiing, i.e. that powers and that controls the electromechanical drive actuator 7 of the drive device 6. Thus, in the event of losing one of the pieces of electrical equipment 13a and 13b, no loss or degradation of the taxiing function is observed.

In the event of a failure of the power supply unit of the other piece of electrical equipment 13b, the contactor array 45 may be configured to apply an outgoing power supply voltage on the input/output E/S4 and thus on the input/output port 46. The outgoing power supply voltage is the low power supply voltage. Thus, the piece of electrical equipment 13a powers the other piece of electrical equipment 13b with the outgoing power supply voltage.

Likewise, in the event of a failure of the power supply unit 37 of the piece of electrical equipment 13a, an incoming power supply voltage coming from the other piece of electrical equipment 13b is applied to the input/output port 46 and to the input/output E/S4 of the contactor array 45. The piece of electrical equipment 13a is then powered by the incoming power supply voltage supplied by the other piece of electrical equipment 13b. The incoming power supply voltage is likewise equal to the low power supply voltage.

It should be observed that the incoming power supply voltage and the outgoing power supply voltage are both transmitted over the same low-power bus 34.

The contactor array 45 is configured so that when the processor unit 32 receives a control signal to activate the brake fan 12, the contactor array 45 applies the low power supply voltage to the output S1 of the contactor array 45. The low power supply voltage is then transmitted to the brake fan 12 via the low-power cable 19.

The contactor array 45 is permanently configured so that the piece of electrical equipment 13a powers the sensors 8 and the data concentrator 11. The contactor array 45 thus applies the low power supply voltage to the outputs S2 and S3 of the contactor array 45. The low power supply voltage is transmitted to the sensors 8 and to the data concentrator 11 via the low-power cables 20 and 23.

The contactor array 45 may also be configured to perform load shedding, i.e. to disconnect one or more electromechanical braking actuators 4 or the drive device 6 or one of the other pieces of equipment (brake fan 12, data concentrator 11, etc.). Such load shedding may be necessary in the event of a failure of one of these pieces of equipment or in the event of a failure of the ATA24 equipment (electrical master box 28, electricity generator, electricity storage means, etc.).

Advantageously, the processor unit 32 and/or the power supply unit 37 and/or the power converter unit 40 and/or the distribution unit are field replaceable. Thus, in the event of one of these units failing or in the event of a maintenance operation being necessary, an operator on the ground can access the unit in question easily via the door of the cabinet and proceed to remove the unit and replace it.

Naturally, the invention is not limited to the embodiment described, but covers any variant coming within the ambit of the invention as defined by the claims.

In a piece of electrical equipment, the number of power converter members may be different.

The braking power supply voltage and the drive power supply voltage may be different, as may be the braking control voltage and the drive control voltage. Likewise, the equipment power supply voltage, the fan power supply voltage, the sensor power supply voltage, the data concentrator power supply voltage, and/or the outgoing power supply voltage may be different.

The drive power supply voltage is not necessarily generated by a power converter member that also generates the braking control voltage. The drive control voltage could also be generated by connecting two or more converter members 41 in parallel, this being done by the contactor array 45.

The architecture described could be different. For example, it is possible to have a single piece of electrical equipment for each undercarriage, some other number of electromechanical braking actuators per brake, etc.

The invention claimed is:

1. A piece of electrical equipment for connecting both to at least one electromechanical braking actuator arranged to brake a wheel of an aircraft undercarriage and also to at least one electromechanical drive actuator arranged to drive the wheel in rotation, the piece of electrical equipment comprising:
    a processor unit arranged to generate a braking motor control signal from a braking setpoint and a drive motor control signal from a taxiing setpoint;
    a power supply unit arranged to generate an equipment power supply voltage for powering the piece of electrical equipment, a braking power supply voltage, and a drive power supply voltage;
    a power converter unit arranged to generate a braking control voltage from the braking control signal and the braking power supply voltage, and a drive control voltage from the drive motor control signal and the drive power supply voltage; and
    a distribution unit arranged to distribute the braking control voltage to the electromechanical braking actuator and the drive control voltage to the electromechanical drive actuator,
    wherein each of the processing unit, the power supply unit, the power converter unit, and the distribution unit are included in a same housing, and
    wherein the same housing is attached to the undercarriage.

2. A piece of electrical equipment according to claim 1, wherein the housing has a door arranged to enable an operator on the ground to access the inside of the housing.

3. A piece of electrical equipment according to claim 2, wherein the processor unit and/or the power supply unit and/or the power converter unit and/or the distribution unit are field replaceable units.

4. A piece of electrical equipment according to claim 1, wherein a braking control module, a braking motor control module, a taxiing control module, and a drive motor control module are programmed in the processor unit.

5. A piece of electrical equipment according to claim 1, wherein the power supply unit is also arranged to generate a power supply voltage for a data concentrator and/or a sensor and/or a brake fan connected to the piece of electrical equipment.

6. A piece of electrical equipment according to claim 1, wherein the power converter unit includes a plurality of power converter members, each comprising an inverter.

7. A piece of electrical equipment according to claim 1, wherein the distribution unit comprises a contactor array that is configurable by the processor unit.

8. A piece of electrical equipment according to claim 7, wherein the contactor array can be configured so that the piece of electrical equipment controls braking of the wheel or rotary drive of the wheel.

9. A piece of electrical equipment according to claim 7, wherein the contactor array applies an outgoing power supply voltage on an input/output port of the piece of electrical equipment, the outgoing power supply voltage being for powering another piece of electrical equipment.

10. A piece of electrical equipment according to claim 9, wherein the contactor array and the input/output port are arranged in such a manner that an incoming power supply voltage, coming from the other piece of electrical equipment can be applied to the input/output port in such a manner as to power the piece of electrical equipment in the event of a failure of the power supply unit of the piece of electrical equipment.

11. A piece of electrical equipment according to claim 7, wherein the contactor array can be configured to perform load shedding.

12. A piece of electrical equipment according to claim 1, wherein the power supply unit includes protection means arranged to prevent power returning to an electrical system of the aircraft situated upstream from the piece of electrical equipment.

13. A system comprising two pieces of electrical equipment according to claim 1 and both a communication bus and also a power bus connecting together the two pieces of electrical equipment, an electromechanical braking actuator, and an electromechanical drive actuator.

14. An undercarriage including a system according to claim 13.

15. The piece of electrical equipment according to claim 1, wherein the housing is a cabinet.

16. The piece of electrical equipment according to claim 15, wherein the cabinet is attached to a leg of the undercarriage.

17. The piece of electrical equipment according to claim 16, wherein the cabinet comprises a door for access an inside of the cabinet.

18. The piece of electrical equipment according to claim 1, wherein the housing comprises a door for access an inside of the housing.

19. Aircraft comprising:
an electrical master box connected to a high-power bus,
a computer integrated in the avionics network of the aircraft and connected to a digital communication bus,
undercarriages having wheels each equipped with at least one electromechanical braking actuator arranged to brake the wheel, at least one electromechanical drive actuator arranged to drive the wheel in rotation, and a piece of electrical equipment for connecting both to said at least one electromechanical braking actuator and also to said at least one electromechanical drive actuator,
each piece of electrical equipment comprising a housing that is attached to the undercarriage and that comprises inside the housing:
a processor unit connected to the digital communication bus for receiving a braking setpoint and a taxiing setpoint from the computer via the digital communication bus, and arranged to generate a braking motor control signal from a braking setpoint and a drive motor control signal from a taxiing setpoint;
a power supply unit connected to the high-power bus for receiving a general power supply from the electrical master box, and arranged to generate an equipment power supply voltage for powering the piece of electrical equipment, a braking power supply voltage, and a drive power supply voltage;
a power converter unit arranged to generate a braking control voltage from the braking control signal and the braking power supply voltage, and a drive control voltage from the drive motor control signal and the drive power supply voltage; and
a distribution unit arranged to distribute the braking control voltage to the electromechanical braking actuator and the drive control voltage to the electromechanical drive actuator.

* * * * *